(12) United States Patent
Adolph et al.

(10) Patent No.: US 7,565,064 B2
(45) Date of Patent: Jul. 21, 2009

(54) METHOD AND DEVICE FOR UPDATING A LOCAL COPY OF METADATA

(75) Inventors: Dirk Adolph, Ronnenberg (DE); Stefan Kubsch, Hohnhorst (DE); Hui Li, Hannover (DE); Harald Schiller, Hannover (DE); Wolfgang Klausberger, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 512 days.

(21) Appl. No.: 10/925,247

(22) Filed: Aug. 24, 2004

(65) Prior Publication Data

US 2005/0050518 A1    Mar. 3, 2005

(30) Foreign Application Priority Data

Aug. 27, 2003    (EP)    ................. 03090270

(51) Int. Cl.
   *H04N 9/79*    (2006.01)
   *H04N 5/00*    (2006.01)
(52) U.S. Cl. ........................ 386/126; 386/45
(58) Field of Classification Search ............. 386/1, 386/45–46, 68–69, 125–126; 725/88, 105, 725/50, 51, 55
See application file for complete search history.

(56) References Cited

U.S. PATENT DOCUMENTS

| 2003/0182255 | A1 | 9/2003 | Plastina et al. |
| 2005/0177858 | A1* | 8/2005 | Ueda .................. 725/105 |
| 2005/0188409 | A1* | 8/2005 | Daniels ............... 725/88 |

FOREIGN PATENT DOCUMENTS

| EP | 1274022 | 1/2003 |
| WO | WO98/49686 | 11/1998 |
| WO | WO01/79964 | 10/2001 |

OTHER PUBLICATIONS

Search Report.

* cited by examiner

*Primary Examiner*—Thai Tran
*Assistant Examiner*—Nigar Chowdhury
(74) *Attorney, Agent, or Firm*—Robert D. Shedd; Harvey D. Fried; Joel M. Fogelson

(57) ABSTRACT

The invention relates to the updating of a local copy of metadata. First change history data of metadata are read from an optical storage medium. Second change history data of the metadata are read from a local storage of an optical storage medium playback and/or recording device. If the first and second change history data are different a change attribute is read a from the optical storage medium and an update operation of the metadata stored in the local storage or an update operation in the optical storage medium is determined depending on the change attribute.

5 Claims, 8 Drawing Sheets

| Advanced Action Attributes: | | |
|---|---|---|
| AAA1 | | create new |
| AAA2 | real-change | add MetaDataLink |
| AAA3 | | modify MetaDataLink |
| AAA4 | | delete MetaDataLink |
| AAA5 | | modify MetaDataContent |
| AAA6 | clone & change | add MetaDataLink |
| AAA7 | | modify MetaDataLink |
| AAA8 | | delete MetaDataLink |
| AAA9 | | modify MetaDataContent |

Fig.8

METHOD AND DEVICE FOR UPDATING A LOCAL COPY OF METADATA

This application claims the benefit, under 35 U.S.C. § 119 of European Patent Application 03090270.4, filed Aug. 27, 2003.

FIELD OF THE INVENTION

The invention relates to the field of optical storage, and more particularly to metadata being stored on optical storage media.

BACKGROUND OF THE INVENTION

Streaming is a technology which is used for storing, transmitting and broadcasting packetised digital data, e.g. for audio and video broadcasting services. Often additional information is provided as an added value accompanying the audio and video data stream. For example, video summaries, story boards, cast background information, advertisements etc. are transmitted together with the streaming media as metadata. Metadata is defined as 'data about data'. In multimedia applications, metadata typically are data about audio-visual (AV) data, these AV data often being called 'essence'.

When recording such a broadcast audio and video (AV) data stream together with metadata on storage media like Blue-ray Disc (BD) it becomes necessary to link the metadata to the AV stream. This is also true for manually added metadata. As an example, a user may want to link a short biography about J. Dean pulled from the internet to the AV of the movie "East of Eden". The link may be desirable to point to a special scene within the movie when J. Dean is starting the car race ending at the cliffs.

Metadata are data about data giving additional information about the recorded material whereas providing a link to the AV stream and/or other related metadata described. A typical example is a movie summary giving background information about an AV stream recorded having a link that allows starting the AV stream on request. Furthermore it could also have further links to metadata describing the live of the movie actors.

Typically metadata are produced by professional content providers like DVB broadcasters, internet services of television news papers.

SUMMARY OF THE INVENTION

The invention facilitates updating a local copy of metadata. When an optical storage medium, to which metadata is related, is used for the first time on a playback and/or recording device a local copy of the metadata is stored in local storage of the playback and/or recording device. Subsequently the user may use another playback and/or recording device for rendering of data stored on the optical storage medium and for modifying the metadata which is stored on the optical storage medium. If such a change of the metadata occurs a corresponding entry is made in change history data stored on the optical storage medium. Further a change attribute is written on the optical storage medium in order to indicate the kind of modification which has been performed. When the first playback and/or recording device is used again for the optical storage medium the change history data which is stored on the optical storage medium and the change history data stored in the local storage are compared. If the change history data is different this indicates that in the meanwhile the metadata which is stored on the optical storage medium has been changed. In response, the corresponding change attribute is read from the optical storage medium and an update operation is determined in order to update the local copy of the metadata which is stored in the local storage of the playback and/or recording device. Storing up-to-date copies of metadata in local storage of a playback and/or recording device has the advantage that a user of the device can quickly obtain an overview of his or her collection of optical storage media and its associated metadata. Further the invention simplifies the exchange of optical storage media between different users having different playback and/or recording devices.

It is to be noted that the invention is not restricted to a particular kind of optical storage medium but that any suitable optical storage medium can be used, such as CD, DVD or BD.

In principle, the inventive method is suited for updating a local copy of metadata, the method including the steps:

reading first change history data of metadata from an optical storage medium;

reading second change history data of metadata from local storage of a playback and/or recording device for said optical storage medium;

if the first and second change history data are different, reading a change attribute from said optical storage medium and determining an update operation of the metadata stored in said local storage or an update operation in said optical storage medium depending on said change attribute.

In principle the inventive playback and/or recording device for an optical storage medium includes:

a local storage for storing metadata and change history data of said metadata;

means for comparing the change history data stored in said local storage and change history data of metadata stored on said optical storage medium;

means for determining an update operation for the metadata stored in said local storage if the change history data of said local storage and of said optical storage medium are different, whereby the update operation is determined depending on a change attribute being stored on said optical storage medium;

means for determining an update operation for the metadata stored in said optical storage medium if the change history data of said optical storage medium and of said local storage are different, whereby the update operation is determined depending on a change attribute being stored on said local storage.

BRIEF DESCRIPTION OF THE DRAWINGS

Exemplary embodiments of the invention are described with reference to the accompanying drawings, in which:

FIG. 8 shows various advanced action attributes for metadata.

DETAILED DESCRIPTION OF PREFERRED EMBODIMENTS

Figure 1:
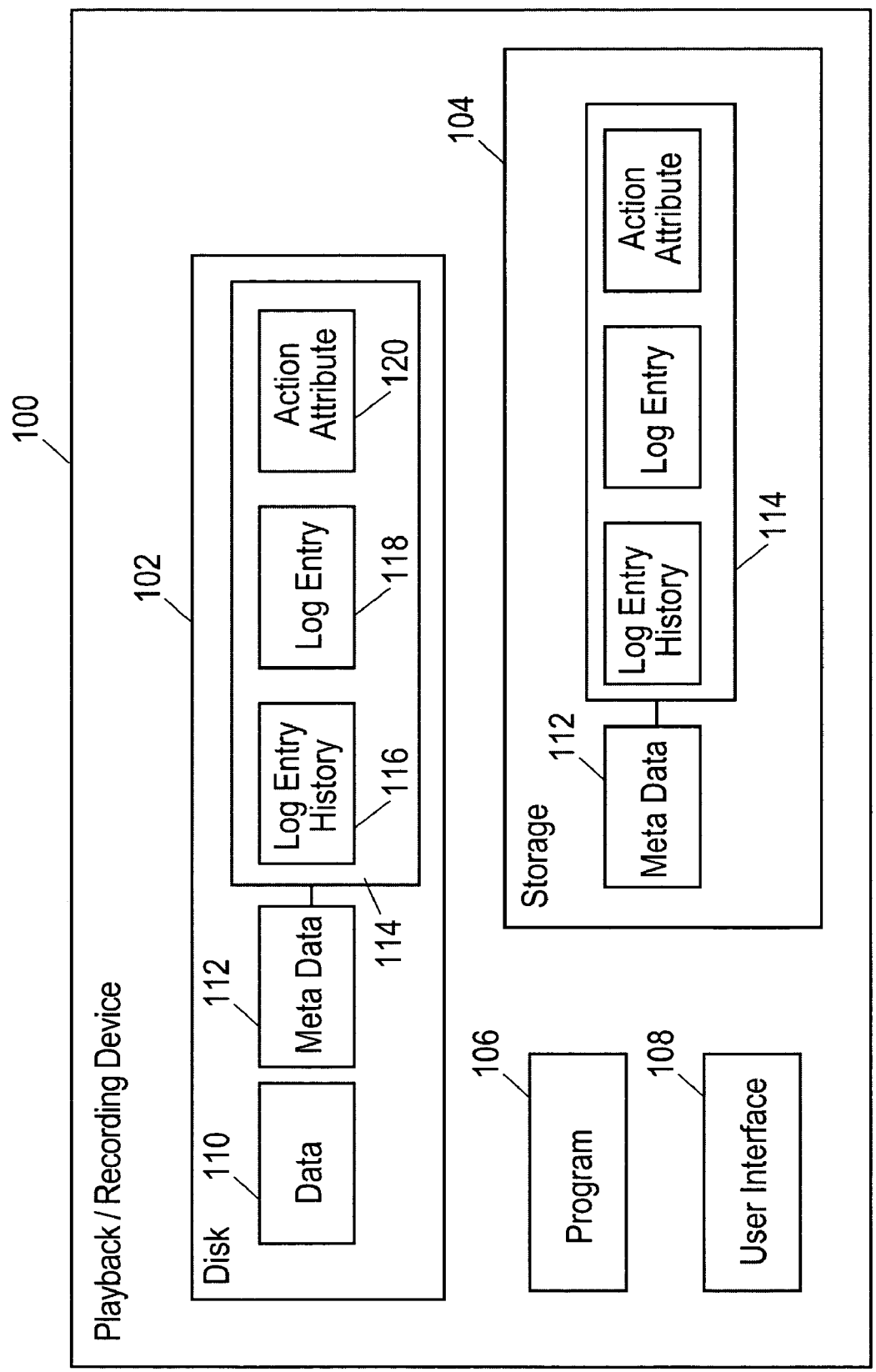
FIG. 1 is a block diagram of a playback and/or recording device in accordance with a preferred embodiment of the invention.

FIG. 1 shows playback and/or recording device 100 for playback and/or recording of optical disk 102. For example optical disk 102 is a CD, DVD or BD. Device 100 has local storage 104 for permanent storage of metadata. For example local storage 104 is a memory card, hard disk or other kind of permanent storage device. Further playback and/or recording device 100 includes program 106 for controlling its operation as well as the operation of user interface 108.

Data 110, such as an AV stream, is stored on optical disk 102. Further metadata 112 about data 110 is stored on optical disk 102. Metadata 112 is stored associated with metadata descriptors 114, i.e. log entry history data 116, log entry data 118 and action attribute data 120. Log entry history data serves for storing a change history of the metadata, and action attribute data 120 contains change attributes for the metadata modifications that have been performed.

By user interface 108 a user can modify, delete and/or add metadata, i.e. metadata content and/or metadata links. When such a modification of metadata is entered, program 106 assigns a corresponding action attribute to the modification and writes a corresponding entry into log entry history data 116 and action attribute data 120.

A local copy of metadata 112 and metadata descriptors 114 is stored in local storage 104 such that the user may still access the metadata of optical disk 102 after optical disk 102 has been removed from device 100.

Figure 2:
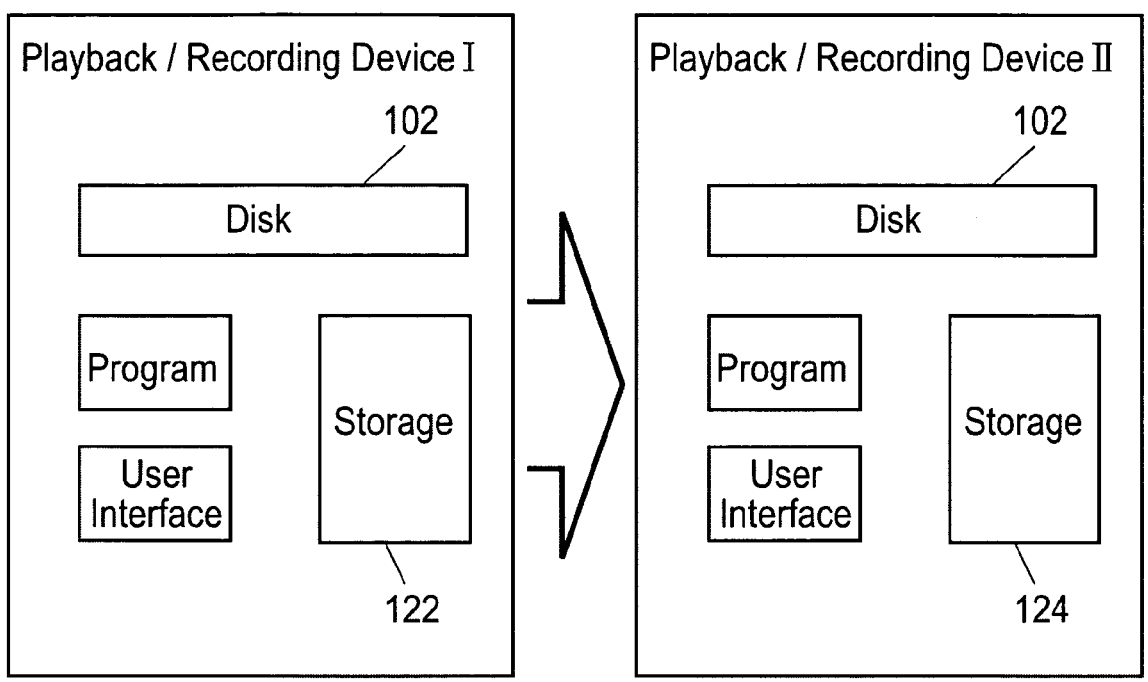
FIG. 2 illustrates usage of an optical disk on two different playback and/or recording devices.

If optical disk 102 is used on different playback and/or recording devices a local copy of metadata 112 and of metadata descriptors 114 is maintained in each one of the local storages of the corresponding playback and/or recording devices. This is illustrated in the schematic diagram of FIG. 2. Playback and/or recording devices I and II are of similar design as playback and/or recording device 100 of FIG. 1. When device I is used with optical disc 102, a copy data of metadata 112 and of metadata descriptors 114 is stored on local storage 122. When optical disk 102 is used with device II, again a copy is made on local storage 124 of device II.

Figure 3:
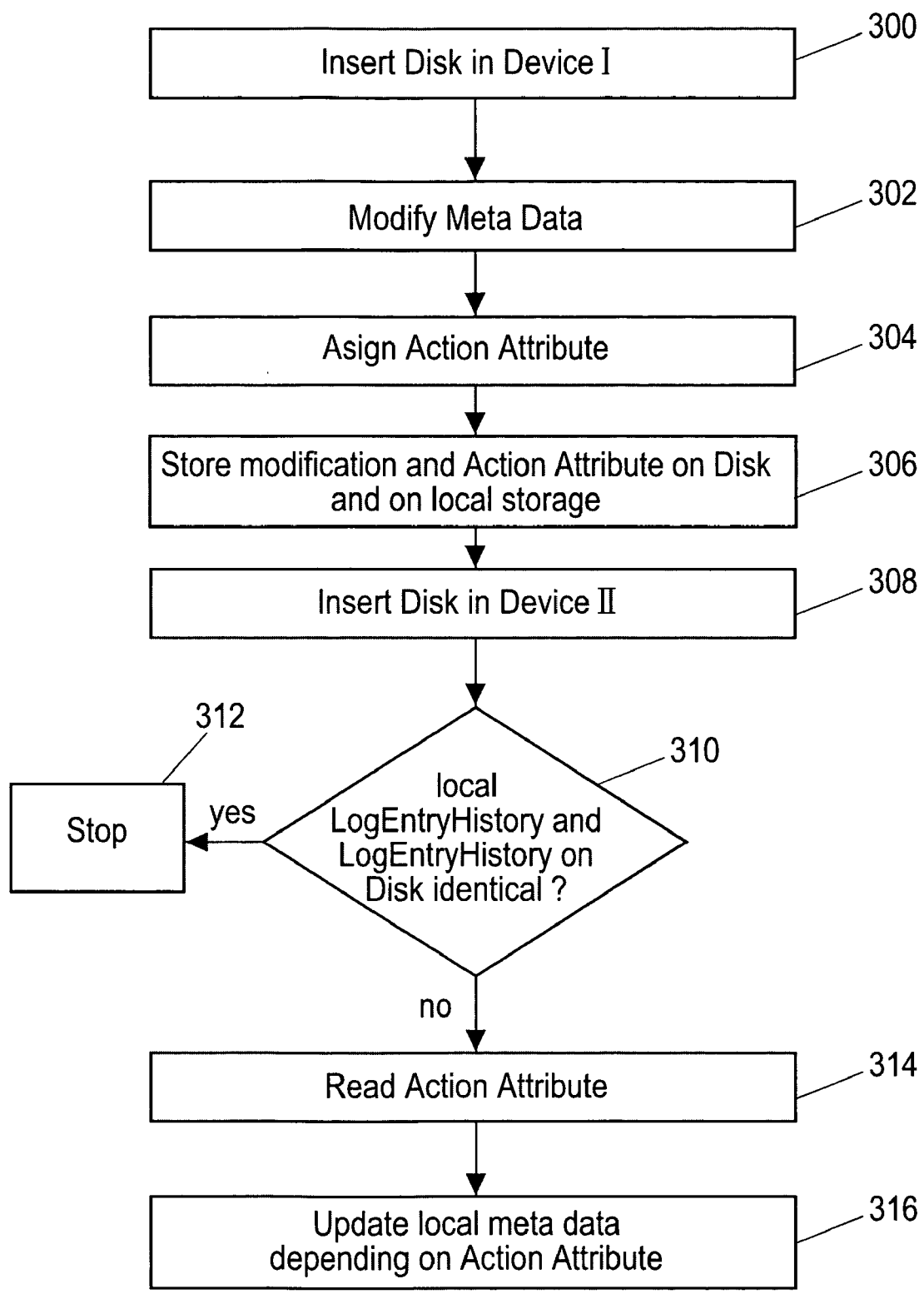
FIG. 3 is illustrative of a preferred embodiment of a method of the invention.

FIG. 3 is a flow chart illustrating an embodiment for updating the local copy of the metadata in the local store of a playback and/or recording device. In step 300 the optical disk is inserted in playback and/or recording device I. In response a local copy of the metadata and of the metadata descriptors is made. In step 302 the metadata which is stored on the optical disk is modified. In step 304 an action attribute being descriptive of the kind of modification of the metadata is determined from a pre-defined set of action attributes.

In step 306 the modification of the metadata and of the action attribute is stored on the optical disk and in the local storage of device I.

In step 308 the optical disk is removed from device I and inserted in playback and/or recording device II. The optical disk had been used with device II before such that a local copy of metadata and metadata descriptors of the optical disk is already stored in local storage of device II (cf. local storage 124 of FIG. 2).

In step 310 it is therefore checked whether the log entry history data stored on the optical disk and the log entry history data stored in the local storage of device II is identical. If this is the case no further action needs to be carried out on the metadata and the procedure stops in step 312. Otherwise the action attribute is read from the optical disk in step 310. Based on the action attribute an update procedure for updating the local copy of the metadata stored in local storage of device II is determined and executed in step 316.

It is to be noted that the invention also enables the inverse operation, i.e. an update operation in the optical storage for synchronisation with the local storage. This is useful for merging various local metadata into a single optical storage.

Figure 4:
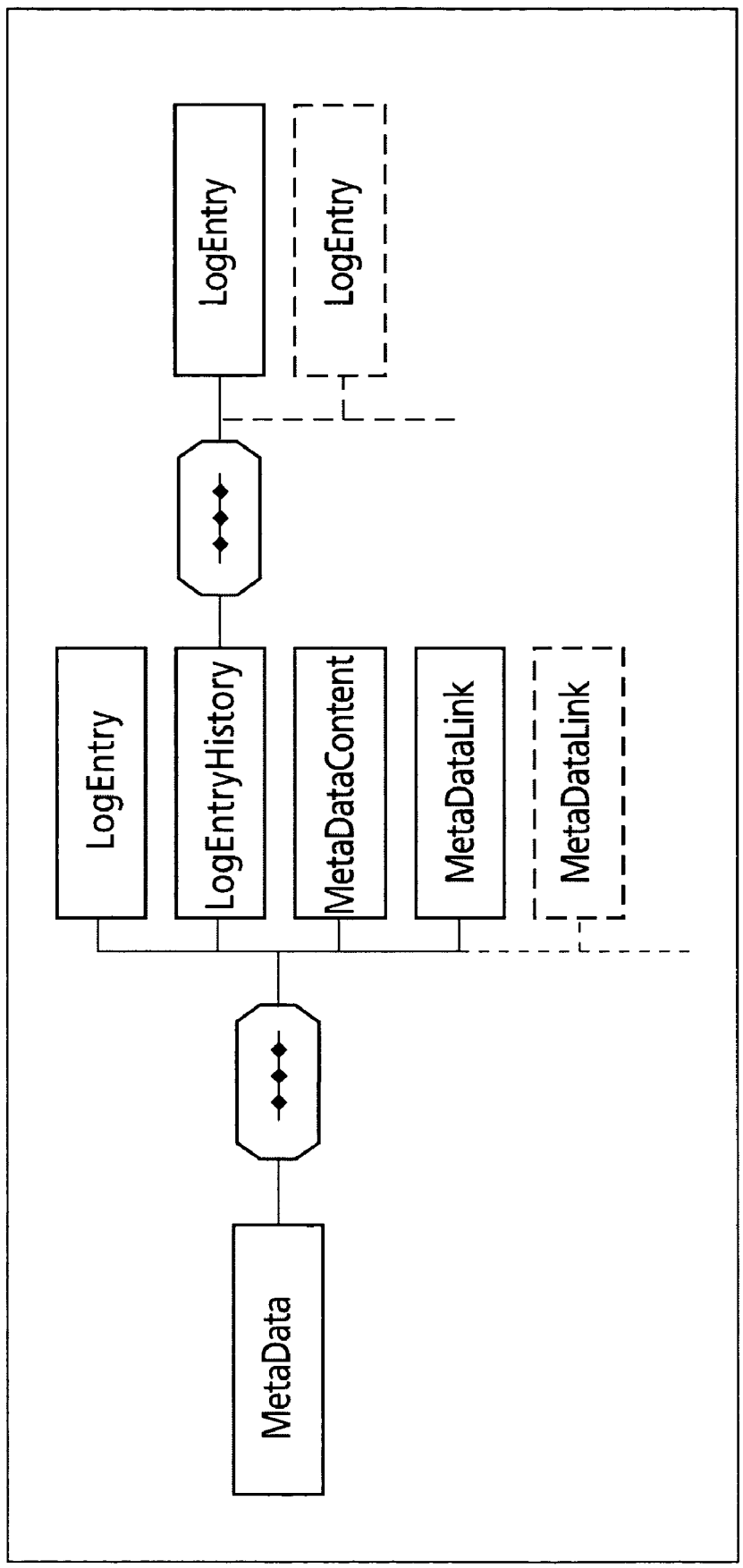
FIG. 4 is a metadata descriptor scheme.

Preferably metadata are stored as metadata descriptors and can be described by means of XML as shown by the schema within FIG. 4. The metadata descriptor is structured hierarchically and consists of four elements: 'Log Entry', 'Log Entry History', 'Metadata Link' and 'Metadata Content'. The 'Metadata:Metadata Content' holds the information presented to the user, for example the summary about the movie describing actors and the story line. The 'Metadata:Metadata Link' holds a link for the essence data referencing at, for example, the pointer feasible to start a playback of the movie described. The structure of the metadata descriptor supports the existence of more than one 'Metadata:Metadata Link' elements. This is useful for example in case different movies are available for an actor characterised by the 'Metadata Content'. 'Metadata Content' and 'Metadata Link' are not of special interest for this invention.

The 'Metadata:Log Entry History' consists of a list of 'Log Entry' elements. All 'Metadata:Log Entry History:Log Entry' elements within the list have previously been a 'Metadata:Log Entry' and were generated by being copied from the Metadata level to the 'Metadata:Log Entry History' level.

Figure 5:
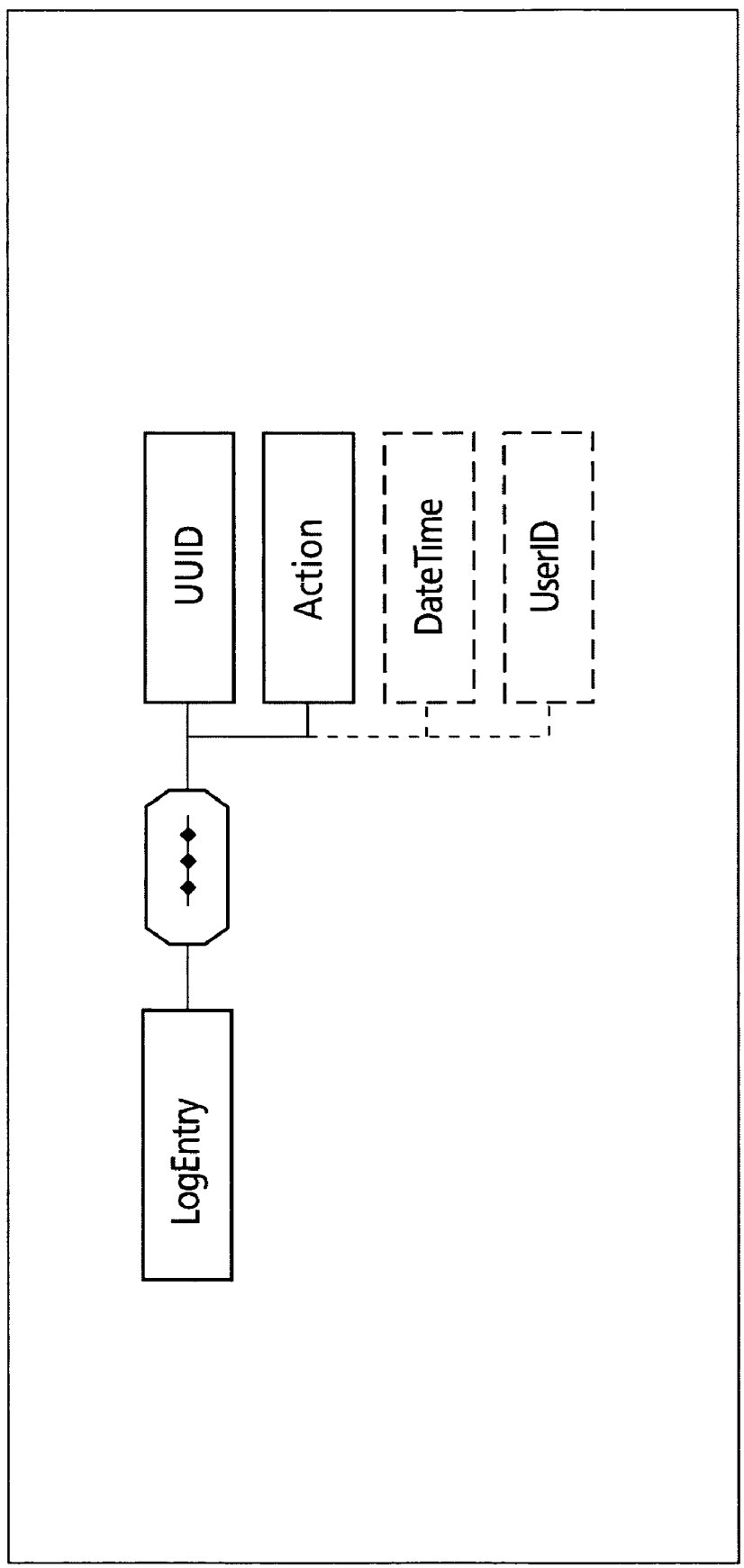
FIG. 5 is a log entry descriptor scheme.

The 'Log Entry' element in turn, i.e. 'Metadata:Log Entry History:Log Entry' as well as 'Metadata:Log Entry', contains further elements as depicted within FIG. 5. Such elements are 'UUID' and 'Action', and optionally the elements 'Date Time' and 'User ID'.

The 'Log Entry:UUID' element is the Universal Unique Identifier (cf. ISO-11578, ISO/IEC 11578:1996. "Information technology—Open Systems Interconnection—Remote Procedure Call (RPC)" and "UUIDs and GUIDs"; Leach, Paul J.; Salz, Paul Network Working Group—Internet Draft—Feb. 4, 1998) which can be independently and unambiguously generated by any unit (e.g. a recorder) for every 100 nsec. The 'Log Entry:UUID' has the purpose of identifying every single object generated (recorded) by a unit independently from its current storage location.

The 'Log Entry:Action' element contains a description of the process which causes its generation, e.g. when generating a metadata the action is 'create new'. This is the location where the AdvancedActionAttribute is located.

The optional elements 'Log Entry:Date Time' and 'Log Entry: User ID' contain the date and time for creating the new Log Entry as well as a (possibly local) ID of the user causing the new entry.

A metadata is 'modified' in the following cases:

A metadata is modified either if 'Metadata:Metadata Content' is changed, this could be the case when editing the video summary for example, or if the 'Metadata:Metadata Link' is changed, this could be the case when adjusting the reference for example;

On generative processes, this could be the case if the complete metadata descriptor Metadata is generated or if further 'Metadata:Metadata Link' elements are appended for example.

Any modification will cause the following steps to be executed within 'Metadata:Log Entry' and 'Metadata:Log Entry History':

1) If existing, copy the 'Metadata:Log Entry' and append it to the list within 'Log Entry History'. Thereby the 'Metadata:Log Entry' is becoming a 'Metadata:Log Entry History:Log Entry'

2) Create a new 'Metadata:Log Entry' containing a new 'UUID' and the actual 'Action' executed. An already existing 'Metadata:Log Entry' is substitute by the new one.

By this procedure the 'Log Entry History' is growing like bark rings of a tree and will carry all 'Log Entry' elements that ever having been assigned to the metadata during lifetime.

It is important to pay attention to the fact that two metadata having the same Log Entry:UUID are considered to be identical and therefore any copying or moving of metadata will not cause a new 'Log Entry'. As a consequence of this, it is assumed that two metadata with the same 'Log Entry:UUID' will not exist on the same storage media, or if so are automatically reduced to a single one by deleting one of it.

By using the Advanced Action Attributes within the Action element the detection of similarities and redundancies between different metadata becomes possible. This prepares the basis to provide sophisticated user support to help foster metadata.

Figure 6:
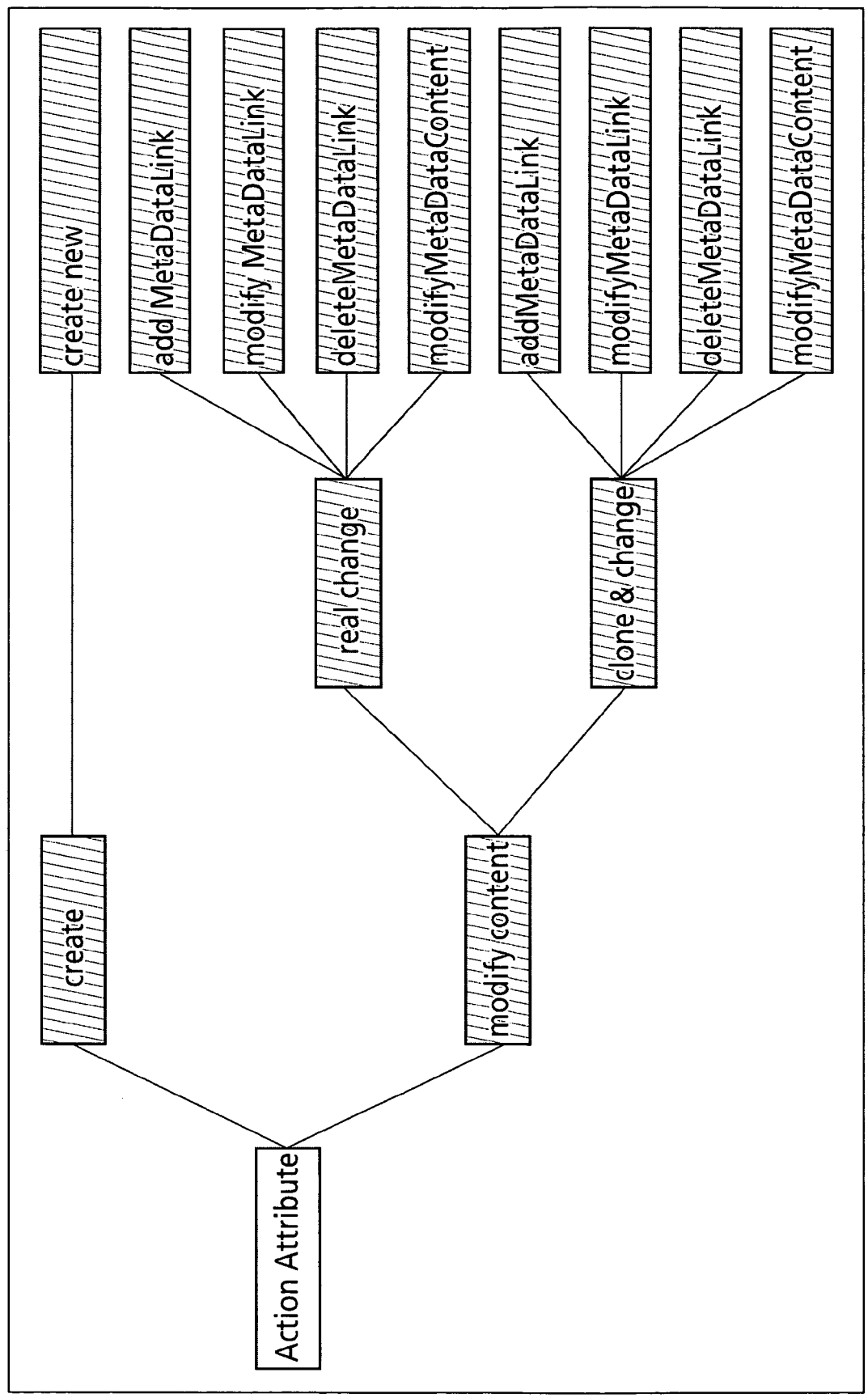
FIG. 6 is illustrative of various action attributes.

The Advanced Action Attributes (AAA) inscribed for the 'Log Entry:Action' element is one out of the list as depicted within FIG. 6. The AAA is defined in nine flavours and has the depicted hierarchical structure. The creation of metadata has always the same action called "create new". This is the initial very first 'Log Entry' generated and can be found within every 'Log Entry History'. If two metadata histories have an identical 'Log Entry:UUID' with 'Log Entry:Action'="create new", it is proved that both were generated from the same ancestor.

The action "modify content" is divided into the two attribute sub-classes "real change" and "clone & change". The difference between the sub-classes "real change" and "clone & change" is, that in the latter any change was not executed on the original metadata but on a cloned one only. In other words the original metadata inclusive its 'Log Entry' remains unchanged but the modifications are executed on a new metadata with a new 'Log Entry:UUID' inheriting all the 'Log Entry History' from the original. This can be described by generating a descendant (see FIG. 7).

Figure 7:
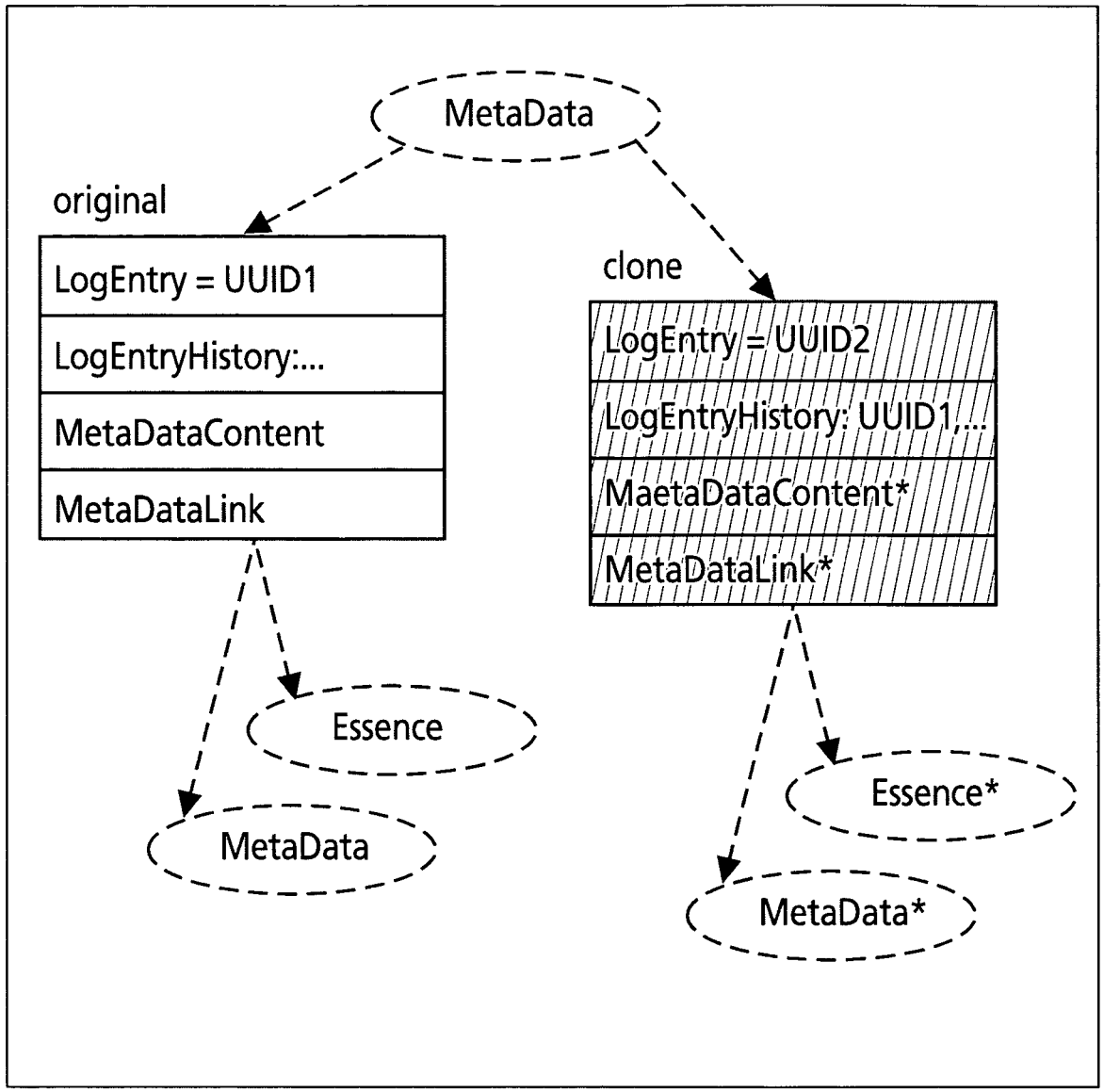
FIG. 7 is illustrative of a clone and/or change process.

A change on metadata qualified by the sub-class attribute "real change" will be executed on the original metadata itself and therefore is irreversible. In FIG. 7 the left part of the image would vanish and merely the shaded part would remain.

The sub-classes "real change" and "clone & change" in turn have four sub-flavours: "add Metadata Link", "modify Metadata Link", "delete Metadata Link" and "modify Metadata Content". These sub-flavours qualify the modifications executed on metadata:

"add Metadata Link" indicates that a further 'Metadata Link' element has been added to the Metadata;
"modify Metadata Link" describes that an already existing 'Metadata Link' has been changed in place;
"delete Metadata Link" protocols the removing of a 'Metadata Link' element from Metadata;
the attribute "modify Metadata Content" is indicating that the 'Metadata Content' of the metadata, e.g. the video summary, has been modified.

FIG. 8 lists all different Advanced Action Attributes possible when the leaves of all attribute sub-classes and flavours in FIG. 6 are considered. The resulting nine attributes AAA1 till AAA9 could be coded by using 4 bits.

In the following the achievable benefits when using the Advanced Action Attributes are described:

A) Allows the detection of redundant metadata residing on the same volume or instrument.

If two metadata differ by k additional 'Log Entries' carrying the AAA2 (AAA6), it is clear that the older one (predecessor) is redundant. Also when two metadata differ by the additional 'Log Entries' carrying AAA7, AAA8 or AAA9 the older original one may be redundant.

B) Allows the detection of conflicting metadata residing on different volumes.

If two metadata differ by k additional 'Log Entries' carrying the AAA3 or AAA4 (AAA7 or AAA8), it is possible that the predecessor metadata has an obsolete 'Metadata Link' due to the fact that essence data pointing to it has been modified. In this case the check of the predecessors 'Metadata Link' is urgently indicated.

C) Supports solving strategies for removing redundant metadata and for repairing conflicting metadata.

For example, if two metadata differ by k additional 'Log Entries' carrying the AAA5 (AAA9), the predecessor is potentially redundant. For example, if two metadata differ by deviating "evolution" in the 'Log Entry History' by having the same predecessor the merging of siblings may be proposed. This would be the case if AAA2 (AAA6) were the only difference between separate instances caused by independently adding different 'Metadata Links'.

D) Supports automatic system assistance for the user upon detection of redundancy or conflict on metadata.

The system can:
D1) Act by warning the user and he has to care for a solution manually;
D2) Act by proposing a single repair solution and the user can rise a veto;
D3) Act by proposing a list of alternative repair solutions and the user can select one of it;
D4) Repair unconditionally.

D2) and D3) can be specified by some applications:

For example, if two metadata differ by k additional 'Log Entries' carrying the AAA3 (AAA7), the system may assist by telling the user k additional 'Metadata Links' in the newer metadata.

For example, if two metadata differ by k additional 'Log Entries' carrying the AAA4 (AAA8), the system may assist by telling the user k-x 'Metadata Links' where modified in the newer metadata but x of them on the same link. This could be reached by comparing all 'Metadata Links'.

For example, if two metadata differ by k additional 'Log Entries' carrying the AAA5 (AAA9), the system may assist by telling the user 'Metadata Content' has been modified by the newer metadata k times.

For AAA7, AAA8, AAA9 the user can be informed about the fact that the newer metadata has been generated by cloning the other metadata.

What is claimed is:

1. Method of updating a local copy of metadata, the method including the steps: reading first change history data of metadata from an optical storage medium; reading second change history data of metadata, which the second change history data of metadata represents a local copy of said first change history data of metadata from a local storage of at least one of a playback and recording device for said optical storage medium; comparing said first change history data of metadata read from said optical storage medium with said second change history data of metadata read from said local storage of said at least one playback and recording device; if the first and second change history data are different, reading a change attribute from said optical storage medium and performing at least one of the following steps depending on said change attribute determining an update operation of the metadata stored in said local storage and an update operation in said optical storage medium.

2. The method of claim 1, further including detecting redundant or conflicting metadata.

3. The method of claim 2, further including removing redundant metadata.

4. The method of claim 2, further including generating one or more proposals for said update operation and outputting said one or more proposals on a user interface.

5. The method of claim 1, further including generating one or more proposals for said update operation and outputting said one or more proposals on a user interface.

* * * * *